United States Patent [19]
Rorabaugh et al.

[11] Patent Number: 5,755,173
[45] Date of Patent: May 26, 1998

[54] AMPHIBIOUS AUTOMOBILE WITH A SLEEK DISPLACEMENT HULL IN THE SUBSTANTIAL CONTOUR OF A CANOE

[76] Inventors: Dale Rorabaugh; Ron Costa, both of P.O. Box 1864, Rancho Santa Fe, Calif. 92067

[21] Appl. No.: 689,764

[22] Filed: Aug. 13, 1996

Related U.S. Application Data

[63] Continuation-in-part of Ser. No. 390,500, Feb. 13, 1995, Pat. No. 5,544,607.

[51] Int. Cl.$^6$ .................................................. B63B 1/20
[52] U.S. Cl. ..................... 114/270; 114/282; 114/283
[58] Field of Search .................................. 114/271, 274, 114/282, 281, 283, 292, 270, 343, 344

[56] References Cited

U.S. PATENT DOCUMENTS

| | | | |
|---|---|---|---|
| 3,213,821 | 10/1965 | Godwin | 114/270 |
| 3,216,391 | 11/1965 | Jones | 114/283 |
| 3,983,832 | 10/1976 | Kinder | 114/270 |
| 4,958,584 | 9/1990 | Williamson | 114/270 |

*Primary Examiner*—Stephen Avila
*Attorney, Agent, or Firm*—Fuess & Davidenas

[57] ABSTRACT

An amphibious vehicle, normally an automobile, has a centrally located displacement hull body portion, containing a passenger compartment and an engine, that is of excellent hydrodynamic profile similar to a canoe. Wheels located at the end of four-wheel-drive axle half-shafts in, preferably, a DeDion suspension are located entirely outboard of the displacement hull. The wheels are conventionally suspended in their lowered positions on land, and are raised by actuators on water. Moveable skis first move on a pantograph linkage from first locations upwards and to the rear of the front wheels into second, forward, locations where the ski tips slide under the raised front wheels, deflecting water under the front wheels and generally improving vehicle hydrodynamics in the manner of outriggers. With increasing speed of the vehicle through the water, the skis are moved aft and downward on the pantograph linkage to lowered third locations. There, along with the aft portion of the displacement hull, they present surfaces upon which the amphibious automobile may rise onto plane upon the surface of the water, typically obtaining speeds of 35+ knots.

22 Claims, 8 Drawing Sheets

AMPHIBIOUS AUTOMOBILE WITH A SLEEK DISPLACEMENT HULL IN THE SUBSTANTIAL CONTOUR OF A CANOE

RELATION TO THE RELATED PATENT APPLICATIONS

The present patent application is a continuation-in-part of related U.S. patent application Ser. No. 08/390,500 filed on Feb. 13, 1995, for MOVEABLE SPONSONS FOR HYDROFOIL WATERCRAFT, INCLUDING BOTH LARGE EXTENDED-PERFORMANCE HYDROFOIL WATERCRAFT AND LEAPING PERSONAL HYDROFOIL WATERCRAFT, issued Aug. 13, 1996, as U.S. Pat. No. 5,544,607, to the selfsame Dale Rorabaugh and Ronald Costa who are the inventors of the present application. The contents of the related patent application are incorporated herein by reference.

BACKGROUND OF THE INVENTION

1. Field of the Invention

The present invention generally concerns amphibious vehicles, particularly automobiles.

The present invention particularly concerns an amphibious vehicle, particularly an amphibious automobile, having an in-water contour that is both (i) modified from past norms, and (ii) dynamically reconfigurable. The amphibious automobile so modified may be so dynamically reconfigured to a first in-water configuration so as to present a hydrodynamically sleek profile for slicing through the water. This configuration supports efficient operation in a relatively slower and/or relatively more heavily laden operational regime. Meanwhile, when dynamically reconfigured to a second in-water configuration, the amphibious automobile presents surfaces that permit the automobile to progress more rapidly through the water, rising slightly in the water. This configuration supports efficient operation in another, relatively faster and/or relatively less heavily laden, operational regime. Finally, the automobile is again dynamically reconfigurable to yet a third in-water configuration presenting a three-point planning surface on which the automobile may efficiently plane upon the surface of the water.

The present invention still more particularly concerns an amphibious automobile having any of (i) wheels, (ii) skis, and/or (iii) a front canard that are moveable in position so as to permit the automobile to, in various operational regimes as are associated with various positions of its moveable wheels and/or skis and/or canard, (i) operate on land, (ii) ingress into or egress from the water, (iii) sit motionless in water with good stability and freeboard, (iv) efficiently slice through the water at lower speeds, (v) rise smoothly and controllably onto plane, and (vi) efficiently plane upon the surface of the water.

2. Description of the Prior Art

2.1 General Limitations of the Waterborne Performance of Amphibious Vehicles Amphibious vehicles have been the topic of invention since there first were motive vehicles, and particularly automobiles. Indeed, sufficiently many inventions exist on this topic so that patents regarding amphibious automobiles are classified to their own class and subclass in the classification system of the United States Patent and Trademark Office.

Despite the large number of well-motivated inventions regarding amphibious automobiles for personal and/or business, as opposed to military usage, there have been few amphibious vehicles offered in the market, and these in only modest numbers. One such vehicle is the Amphicar™ amphibious car of Daimler Benz, Germany. (Amphicar™ is trademark of Daimler Benz.) This car, made of steel, used engines first from the British Austin, and later from the Triumph, motor car companies. Its unique attributes permitted the sale of approximately 2500 units, but the difficulties of supporting operation on both land and water resulted in a vehicle with only modest performance on land and with quite poor performance in the water.

More recently the Aquastrada™ amphibious vehicle made in California has used both retractable wheels and water pump propulsion to somewhat improve vehicle performance, although at an increase in complexity.

It is the contention of the inventors of the present invention that amphibious automobiles, a subject of continuing interest and innovation for over one hundred years, have not as of yet been sold in even such modest numbers in the luxury goods and automotive specialty markets as their unique characteristics, and cachet, would seemingly support because of their exceedingly poor performance in the water. The performance of previous amphibious automobiles on land has generally been satisfactory. Indeed, because the automobiles have often been well-powered in order to make any appreciable headway at all in the water, the land-based performance of these vehicles has occasionally been good, and above-average for similar size (if not similar cost) land vehicles.

The performance of previous amphibious automobiles on water has, however, generally been unsatisfactory. Previous amphibious automobiles have presented both (i) a wide frontal area, and (ii) a low freeboard, in water.

Because of their (i) wide frontal area, previous amphibious automobiles have presented tremendous resistance to movement thought the water (by whatsoever propulsive means), and have generally been limited to attaining top speeds of less than ten knots. These top speeds are inferior to regular watercraft for the both the amount of horsepower, and, commonly, the propulsive force that is generated by the amphibious automobile. The slow top speeds attainable have generally been un-satisfying to the owners of the amphibious vehicles, who cannot do much of anything afloat in a vehicle so slow.

Meanwhile, the (ii) low freeboard has served to make previous amphibious automobiles manifestly unsuitable for rough water. Previous amphibious automobiles generally possess a high center of gravity, and are non self-righting. Even if the power to propel a previous amphibious automobile through the water at an increased speed was to be made available, issues of stability might well limit the performance of an amphibious vehicle having the substantially box-like, parallelipiped, shape of an automobile.

Furthermore, it takes a great deal of power to get an amphibious vehicle onto plane, or hydrofoil plane, or at least to do so (i) safely, and (ii) with any control. The aforementioned Aquastrada™ amphibious vehicle with retractable wheels and a water pump propulsion is capable of rising, or more descriptively "lurching", onto plane. The vehicle must driven through the water at a high throttle setting, causing much splashing and wake, until, after a period of time and progress, it will rise onto plane. It can thereafter be maintained on plane only at a speed, and corresponding throttle setting, that is considerable. In other words, the effective hulls of the Aquastrada™, and other, amphibious vehicles are inferior to the hulls of planning boats, and previous amphibious watercraft correspondingly exhibit vastly inferior planning performance to true boats.

2.2 Possibility of Improving the Effective Hull Contour of an Amphibious Vehicle for Cutting Through the Water at Slow Speed The inventors of the present invention therefore contend that it is useful to reconsider the in-water displacement contour of an amphibious vehicle, particularly an amphibious automobile. The horsepower to weight ratio of an amphibious automobile dictates that it could rise onto plane, and could likely go not only satisfactorily fast but quite fast indeed, if only something could be done about the in-water, or above-water hydrodynamic contours of the automobile.

The inventors of the present invention contend that it is useful to commence the re-design of an amphibious automobile by thinking about the hydrodynamics of the automobile's frontal area. Such an area would desirably be small, thin, and sharp: a hydrodynamically superior contour such as would permit the amphibious automobile, in it's operation in water, to cut though the water well and quickly with minimum energy expenditure.

The present invention will be seen to model the displacement of an amphibious automobile in one of its water-borne regimes after a canoe. A canoe is a very efficient design for any watercraft for so long as it remains in the water, and while it is not planing upon the top of the water, nor above the water on hydrofoils or on an air effect.

Meanwhile, the superior in-water contour like as to a canoe of an amphibious vehicle, normally an amphibious automobile, in accordance with the present invention will be seen to improve the freeboard problem. When a canoe-contour amphibious automobile in accordance with the present invention is stationary in the water it will have essentially only its passenger compartment and its engine enclosed, with all other portions of the automobile—most notably the automobile's wheels and its suspension—immersed in the water. The modest amount of weight buoyed, coupled with a substantial displacement (in the substantial shape of the canoe) of the automobile's "hull", will be seen to accord that an amphibious automobile in accordance with the present invention will have a freeboard that is generally greater, and is thus improved, from what was previously common.

In so leaving its wheels and its suspension immersed in the water, an amphibious automobile in accordance with the present invention would seemingly suffer severe drag. The immersed elements are hydrodynamically shaped to minimize drag. The overall performance of the amphibious automobile while fully immersed in water is consequently about as good as exhibited by previous amphibious vehicles. However, an amphibious automobile in accordance with the present invention will be seen to overcome the drag of the remaining free water elements outboard of the "canoe hull" of the automobile.

2.3 Possibility of Improving the Effective Hull Contour of an Amphibious Automobile for Planning Over the Water at High Speed The present invention will be seen to go beyond mere hydrodynamic improvements for fully-immersed in-water performance of an amphibious automobile by deploying any, and preferably all, of (i) moveable wheels (and associated suspension structures), (ii) moveable skis (and associated supporting structures), and (iii) a moveable canard (and associated supporting structures). The preferred amphibious automobile will be seen to have four (4) moveable wheels, two (2) moveable skis, and one (1) moveable canard, or a total of seven (7) moveable elements. These moveable elements will be seen to serve at least two new purposes relative to amphibious watercraft of the prior art.

First, the differing positions of, in particular, the moveable wheels, of an amphibious automobile in accordance with the present invention will be seen to accord very considerably different flotations to the amphibious automobile. These differing flotation affects, in particular, the draft depth below water surface, and, equivalently, the freeboard, of a main watertight hull of the amphibious automobile. In general, when the wheels are in the water (normally when stopped, or a very low speed), then the automobile's draft is minimum or near minimum, and the freeboard is maximum or near maximum (except, of course, for when the vehicle is on plane). The amphibious automobile is floated "high" in the water.

Conversely, when the wheels are extracted out of the water (normally when at, or attempting to go to, a high speed) then the draft is (at least temporarily, before rising onto plane as will be explained) maximum or near maximum, and the freeboard minimum of near minimum. The amphibious automobile sets, at slow speed and at least momentarily before rising onto plane, "deep" in the water.

Second, the differing positions of the (two) moveable wheels and the (two) moveable skis and the (one) moveable canard in the present invention will be seen to accord a very considerably different drag to movement of the amphibious automobile through the water. Selectively with differing positions of, in particular, the moveable skis (as are mechanically backed by the moveable wheels, and as are moved separately from but in relationship to the moveable wheels), a ramp surface is created that will help the amphibious automobile to go onto plane much sooner and slower, and with much less energy, than otherwise.

In other words, an amphibious automobile in accordance with the present invention will be seen, in all it preferable seven (7) moveable elements, to have and present various, differing, in-water hydrodynamic profiles. It is as if the automobile has a reconfigurable hull—although the canoe-shaped watertight hull proper will be seen to remain unchanged.

The moveable canard, in particular, will be seen to help ensure that a deeply immersed, deeply laden, amphibious automobile will not disadvantageously dive, or "submarine", beneath some bow wave.

The moveable wheels, in particular, will be seen to retract to positions that are non-interfering with the on-plane hydrodynamic profile, and performance, of the amphibious automobile.

Finally, the moveable skis will be seen to be the essential mechanism by which an in-water "duckling"—slick and smooth, but somewhat slow, plodding and ugly—smoothly rises onto a full plane on top of the water where, due to a good three-point hydrodynamic planning configuration and abundant horsepower, the amphibious automobile is nearly as fast as equivalent runabout boat. The ability of the moveable skis to function effectively as part of the planning hull will be seen to be a function of (i) their size and bulk, (ii) their positions, (iii) their contours, and (iv) their moveability. Such a function for moveable elements, or skis, in an amphibious vehicle is not known to the inventors to be within the prior art.

SUMMARY OF THE INVENTION

The present invention contemplates an amphibious vehicle, particularly an amphibious automobile, (i) having and presenting a sleek and hydrodynamic contour in the water during operation in one, relatively slower and/or relatively more heavily laden, regime, while also being functionally capable of (ii) rising onto plane upon the surface of the water in another, relatively faster and/or relatively less heavily laden, operational regime.

The preferred amphibious automobile of the invention has and presents a displacement hull in the shape of a canoe, and more particularly a canoe having a truncated, squared, stern. This hull shape is very efficient to slice through the water, and permits the amphibious automobile to attain improved performance in cutting through the water.

The preferred amphibious automobile of the invention further has and presents any one or ones of (i) wheels that are moveable in elevation, (ii) skis that are moveable in position, and/or (iii) a front canard that is moveable in angular rotation. The preferred automobile has each of (i) four moveable wheels, (ii) two moveable skis, and (iii) one moveable front canard.

The preferred four wheels are continuously moveable in elevation between full up and full down positions. The preferred two skis, while always pointing to the forward and maintained substantially co-parallel with the longitudinal axis of the automobile, are continuously moveable on a pantograph-type mechanism to extend and retract between three major positions: 1) retracted and to the rear, 2) extended to the front and under the (two) front wheels, and, intermediary between these two positions, 3) extended to the downward. The preferred moveable front canard is continuously adjustable in angle between positions angled upward, or angled downward, to the fore.

When the (4) moveable wheels are lowered, and the (2) moveable skis are each retracted and to the rear into a corresponding storage volume in the form of a "side box" to the vehicle, the automobile can operate on land, can enter (or exit) the water, and can operate in or on water. The lowered or substantially lowered, or "down", positions of the (4) wheels, and the rearward retracted position of the (2) skis is both normal, and necessary, for land operation. The position of the front canard is not essential for operation in this regime, but the front canard is normally kept level, or angled downward to the fore, for operation on land.

When the automobile enters the water, normally by simply driving in, these same positions of these same elements serve to maximize the freeboard of a central, watertight, canoe-shaped, displacement hull of the automobile. However, a penalty is paid because both the wheels and skis are outboard of the displacement hull. When the wheels are in their down positions, and skis are in their retracted and rearward, positions, then both these elements produce significant drag to an otherwise sleek cutting and slicing movement of the canoe-shaped displacement hull through the water. Normally the (i) wheels are maintained down, and (ii) the skis are maintained retracted to the rear, only in shallow water where it is desired that the wheels should protect the displacement hull and the skis against damage from collision with the bottom.

In deeper water, the (4) moveable wheels can be raised, and, independently but correspondingly, the (2) moveable skis can be extended to the forward. This can be done any time after the automobile has entered adequately deep water. The preferred two skis are extended to the full forward so as to slide under the two raised front wheels by a multi-link positioning mechanism reminiscence of a pantograph, which mechanism is thus called a pantographic positioning mechanism. The skis are thereafter held in their full forward position by the pantographic positioning mechanism, and are mechanically backed and strengthened in these positions by the two (raised) front wheels.

In this configuration of the automobile the great drag of the lowered wheels is reduced by the raising of the wheels, and the hydrodynamics of the automobile is still further improved by the streamlining effects of the forwardly extended skis. The full forwardly extended skis are, with normal loading of the automobile, completely above the waterline. However, the forwardly-extended skis do serve, with increasing speed of the automobile through the water, to impart stability (especially in heavy seas), much as do the outriggers of an outrigger canoe. They are therefore said to improve streamlining, even if only under limited conditions. The substantial waterborne contour of the automobile with its full forwardly extended skis remains, however, substantially that of its canoe-shaped displacement hull.

The front canard is preferably maintained angled upward to the fore during operation in this regime to preclude that the bow of the automobile should undesirably "submarine" into any encountered waves.

The question might well be asked as to why, if the "waterborne contour of the automobile with full forwardly extended skis remains . . . substantially that of its canoe-shaped displacement hull", there is much utility in advancing the skis to the forward at all. The answer is that it is only from the skis' full forwardly advanced positions that they can be reliably efficiently powered in position to the rearward and, more importantly, to the downward, by the pantographic positioning mechanism—even during forward motion of the automobile though the water, such as produces strong drag forces on the lowered skis.

Accordingly, and as good as the canoe-shaped waterborne contour of the amphibious automobile of the present invention already is—and it is already considerably better than previous amphibious automobiles—the real forte to performance is realized when, with increasing speed through the water, the skis are gradually lowered by the pantographic mechanism (as is aided by water friction on the skis) from their full forwardly-extended positions to, ultimately, their full down positions. (The wheels remain stationary, and raised.) The lowered skis initiate lift.

The lowered skis force, at speed, the canoe-shaped hull to rise above the surface of the water, elevated at the bow. The automobile ultimately comes onto plane on three points: its two front skis and the rear of its displacement hull. Water travel in this operational regime of the automobile is very fast, and efficient.

1. Effects of the Moveable Elements on Operation of the Amphibious Automobile in Water In accordance with the present invention, each of moveable (i) wheels (four in number), (ii) skis (preferably two in number), and/or (iii) a (single) front canard device are appropriately attached and suspended relative to a central, displacement, hull of an amphibious watercraft. The moveable wheels are outboard to the displacement hull, and located at the terminus of suspension linkages. They are continuously adjustable in position between (i) a full up position where they are closely proximate too, and slightly angle over, the sides of the displacement hull, and (ii) a full down position where they extend to substantially vertical positions well to each side of, and in part below (consider, e.g., land operation), the displacement hull. When in their full down positions, the wheels are not only suitable for operation of the automobile on land, but also clearly serve to protect the displacement hull from contact with the bottom of a body of water when the automobile is immersed in a body of water.

When, and only when, the wheels are in their full up positions, then the moveable skis that are also exterior to the displacement hull, and that are (normally, and in other operational regimes) housed in flared cavities to each side of the displacement hull, can be extended, normally on a pantographic type linkage, to a range of positions. Of these positions two are paramount: (i) a first position directly under the (fully raised) two front wheels, and (ii) a second fully down position. The moveable skis must actually pass, in an arc-like movement on their pantographic linkages, through the second position to reach the first position. However, in sequence of water craft operation, the first ski position is assume first, and the second ski position later, or second—which is why each position is so called.

That first effect of these moveable (i) wheels and (ii) skis, and the effect that is easiest to understand, is the flotation and protection effect accorded by the wheels and skis to that are moveable relative to the displacement hull of the amphibious automobile when the wheels and skis are respectively in their (i) full down, and (ii) retracted, positions. The wheels in the down position protect the displacement hull and the propulsion not only from the bow, but also from the stern and athwartships. They permit safe operation of the amphibious automobile (i) in shallow water, (ii) during beaching on the land (i.e., pushing onto the shore under water propulsive drive power only, without any wheel rotation), and (iii) during entrance into, or egress from, the water under powered rotation of the wheels.

The effect of the moveable (i) wheels and (ii) skis that is next easiest to understand is the effect that they accord to movement of the amphibious automobile though water when they are still respectively in their (i) full down, and (ii) retracted, positions. These positions leave, depending upon the loading of the amphibious automobile, the substantial entirety of both (i) the wheels and (ii) the skis immersed. This tends to float the displacement hull of the amphibious automobile optimally high, and at a maximum freeboard—at least when the automobile is stopped, of progressing at but a very slow speed. (The maximum freeboard of the amphibious automobile is when it is on plane, to be discussed.) This "hull high" position in the water makes a pleasant seat for the operator/user of the amphibious automobile in the sunshine relatively high above the surface of the water such as during use of the amphibious automobile for, by way of example, stationary fishing.

However, the moveable (i) wheels and (ii) skis respectively in their (i) full down, and (ii) retracted, positions provide considerable drag to such "slicing" movement of the amphibious watercraft through the water as would otherwise be, due to the canoe-shaped displacement hull, quite smooth and efficient.

Conversely, when the moveable (i) wheels, and (ii) skis, are respectively moved to their (i) full up, and (ii) extended, first, positions, then (i) a substantial portion of the wheels, and (ii) the front tip of each ski, will be out of the water. By the physical laws of hydrostatic balance and flotation, the amphibious automobile always floats when stationary on its combined then-immersed volumes of its displacement hull, wheels, and skis. When the wheels and/or skis are raised so as become but partially immersed, then the displacement hull is more deeply immersed, and assumes a minimum freeboard.

The relatively high position of the moveable wheels also has an effect on the stability of the amphibious automobile in each of pitch and roll. Depending upon the height and peak-to-peak size of the prevailing waves, and the angle of the bow-stern axis of the amphibious automobile relative thereto (and also on the loading and the movement(s) of the operator/user and passengers of the amphibious automobile), the amphibious automobile will generally be somewhat less stable with its wheels in their full up positions.

However, and despite the adverse effects on wheel elevation on each of (i) stationary freeboard, (ii) roll moment, and (iii) pitch moment (yaw moment is substantially unaffected), the more complex, and the more useful, effects of the moveable wheels (and skis) are very significant. When the skis are moved under the then-elevated front two wheels then the combination serves to transform a the overall contour of the amphibious automobile substantially into displacement hull, and particularly a semi-displacement or "U" hull, that functions exceedingly well to "plow" through the water at low speeds, and to cut through heavy seas. Namely, the raised wheels and forwardly-extended skis both (i) reduce the amount of structure in the water to the sides of the canoe-shaped amphibious hull, and, commensurate with such reduction, (ii) reduce drag. Therefore, and immediately, the amphibious automobile can be driven through the water more efficiently and smoothly than heretofore. At increasing speeds the skis provide some lift, and the bow of the amphibious automobile will rise under the uplift force provided by its peripheral skis.

Here also, and as good as this improved waterborne contour is, it is not the end of the capabilities of an amphibious automobile in accordance with the present invention. A real forte to performance of an amphibious automobile is finally realized when, in accordance with the present invention, the skis are gradually lowered to their second (and final) positions with increasing speed of the automobile through the water. The automobile will rise gracefully onto plane, and will thereafter efficiently plane (so long as forward speed is maintained), on (i) each of its two skis (now located to the forward and downward, and to the outboard at each side, of the displacement hull), and (ii) the (substantially) flat rear surface of its (camp-canoe-shaped) displacement hull.

The moveable skis in their second, full down, positions permit the amphibious watercraft to come up onto, as well as to drop off, hydrofoil plane quickly, gracefully and smoothly in mild to moderate sea conditions, and with a minimum of power expended, a minimum making of waves and splashes, and minimum of lurching. The skis permit an entire new on-plane operational range of the amphibious watercraft that is not only considerably faster than a plowing or slicing motion of the displacement hull through the water, but that is more fuel efficient.

2. General Construction of a Multi-Operational-Mode Amphibious Automobile

An amphibious automobile in accordance with the present invention has a displacement hull of a shape (i) suitable to slice through heavy seas but, (ii) but insufficiently providing at a first speed of the amphibious automobile through the water any first lifting force by which the amphibious automobile may come onto a first plane on its hull. "Insufficiently providing . . . any first lifting force" is simply a way of saying that the displacement hull does not suffice to be a planning hull at the first speed of the amphibious automobile.

In actual fact, the displacement hull is preferably of a "V" or a "U" shape. Although an amphibious automobile of this hull shape can sometimes be caused, before coming onto plane as altered by its outboard skis, to make only partial contact between the surface of the water and the stern of the displacement hull—normally only under conditions of heavy seas—a "V" or "U" shape hull is generally unsuitable for planning, as will be recognized by nautical architects.

The moveable wheels and skis of the present invention accord still further advantages to the amphibious automobile. When the moveable wheels are raised, and the skis extended, then these structural elements (which are outboard of the displacement hull) serve to shield and protect the inner, or displacement, hull to the amphibious automobile. The raised wheels are positioned laterally extended from the core, displacement, hull. The skis are commonly extended either to their forward, first position of to their down position. Both the raised wheels and the extended skis (in either position) protect the integrity of the inner hull exactly when and where it is needed most when the amphibious automobile in underway: in collisions to the fore and/or to the sides.

3. Preferred Construction of An Amphibious Automobile in Accordance with the Present Invention In order to achieve its canoe-shaped displacement hull of excellent hydrodynamic profile, an amphibious automobile in accordance with the present invention has its wheels located entirely outboard of a centrally located body section, or displacement hull. The suspension components are commonly located inboard as is, or course, the motive drive. Further, these outboard wheels (and associated linkage elements) may be raised and lowered. Still further, the two front wheels are preferably greatly improved in hydrodynamic profile when the amphibious automobile is (i) floating in water with (ii) its wheels raised because these raised wheels may become substantially underlaid with two moveable skis that pantograph into position under the rear of the front wheels from storage positions to the rear of the wheels.

The net effect of (i) the canoe-shaped central displacement hull, (ii) the moveable wheels, and (iii) the contour modifications to the front wheels presented by the underlying skis, is to cause the amphibious automobile to have and present, when its wheels are full up and its skis extended to the forward (first position) under the front wheels, a water displacement similar to a double outrigger canoe. The reduced frontal area of this configuration enhances performance in water. The outboard wheel-skis even provide some roll and pitch stability to the amphibious automobile at speed, serving at similar function to the outriggers of a canoe (although the outboard skis are admittedly heavy, and, even when air-filled as is preferred, of only modest buoyancy).

Finally and most importantly, if (i) the passenger and cargo loading of the displacement hull, and (ii) local sea state, so permit—which is common—then the extended skis can be gradually lowered during movement of the amphibious automobile through the water from their forward first to their downward second positions. This movement (in a way a partial retraction back towards the original storage position) permits, in most configurations of amphibious watercraft in accordance with the present invention during most conditions of loading and sea state and throttle, that the amphibious watercraft should rise onto plane.

The achieved plane is essentially on three points: the two skis to the forward and sides, and the flat of the central, displacement, hull to the rear. On plane most or all of the wheels, and substantially all of the suspension elements leading thereto, will stand clear (albeit normally only but slightly) of the water. In this operational mode the freeboard of the (canoe-shaped) central displacement hull assumes a maximum so long as the on-plane condition is maintained.

One preferred, nominal, amphibious automobile so functioning has a displacement hull of excellent hydrodynamic profile. Namely, it is—save for points where suspension elements enter into the displacement hull and where the propulsion is exposed—in the almost perfect contour of a canoe (particularly a so-called "camp" type canoe having a truncated, flat, stern). This contour can be driven through the water very efficiently and very fast, typically at speeds in excess of 12 knots for an amphibious automobiles seating four of commensurate normal size, typically 5.5 meters in length and 2.46 meters in beam, and of commensurate normal horsepower, typically 230 horsepower.

Moreover, and further, this preferred, nominal, amphibious automobile can be driven, wheels raised and skis extended, onto plane at approximately 12 knots, and thereafter has a top speed, depending upon loading and sea state, of over 35 knots. The waterborne performance is vastly in excess of previous full-size amphibious automobiles.

Therefore, in accordance with the present invention, it will be recognized that several improvements are made to an amphibious automobile.

4. Amphibious Automobiles (i) Having a Canoe-shaped Displacement Hull, and (ii) Rising Onto Plane In its basic embodiment, an amphibious automobile in accordance with the present invention has a centrally located displacement hull body section, containing a passenger compartment and an engine and a steering wheel, that has and presents when floating in water the substantial hydrodynamic aspect of a canoe, meaning that it has a length that is at least two and one-half times the beam at the water line.

Wheels are located in positions outboard of this centrally located displacement hull body section, and are in no way part of or within this displacement hull body section. Necessarily, suspension elements and steering gear must, and do, link the displacement hull body section, and the engine and steering wheel within this section, to the wheels. These suspension elements and steering gear are enshrouded watertight where they pass through the displacement hull body section, and do not significantly alter or diminish the substantial canoe shape of this displacement hull body section.

The wheels and suspension elements, in combination, preferably further include a mechanism for raising and for lowering the wheels between a first, lowered, position for travel of the amphibious automobile on its wheels on land and a second, raised, position during passage of the automobile and its wheels through water.

The amphibious automobile preferably further includes moveable skis located behind at least two wheels. These skis move between a first, raised, position providing clearance to the ground for travel of the automobile on its wheels on land and a second, lowered, position where curved tips of the skis reach around towards the front of the raised wheels and serve to help to deflect such water under the wheels as tends to impinge against the frontal surface of the wheels during a passage of the automobile and its wheels through the water.

Finally, the amphibious automobile preferably still further permits that the moveable skis should be moved from a forwardly-extended first to a downward-extended second position until, as a consequence of this extension while the amphibious automobile move through the water, the amphibious automobile "breaks free" of the water, and rises onto plane upon the surface of the water. In this position the automobile planes upon its two skis and the rear portion of its displacement hull. Only its propulsion, which commonly a prop or a jet drive, is in the water, and drag is minimized while planning speed is maximized. These and other aspects and attributes of the present invention will become increasingly clear upon reference to the following drawings and accompanying specification.

DESCRIPTION OF THE PREFERRED EMBODIMENT

Figure 1:
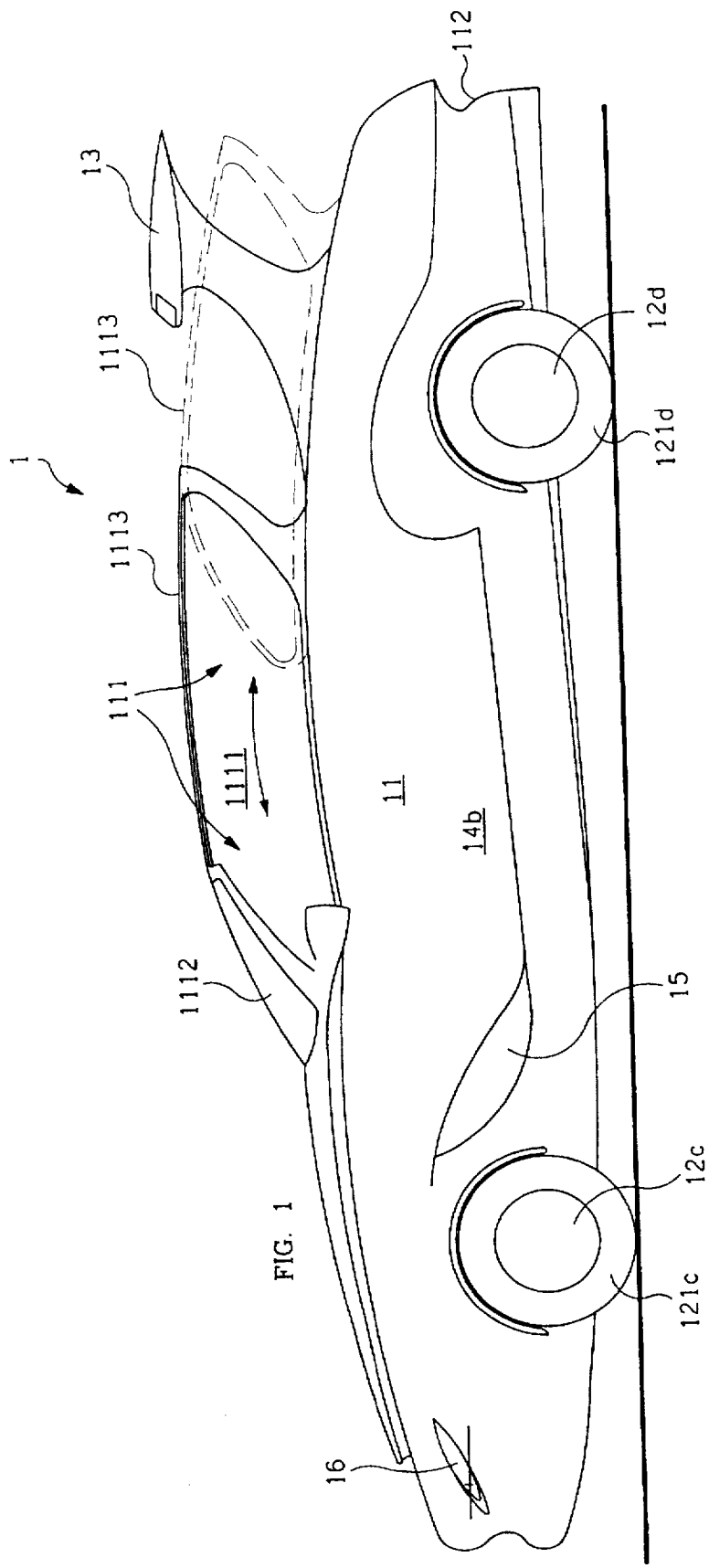
FIG. 1 is a diagrammatic perspective view showing a preferred embodiment of an amphibious automobile in accordance with the present invention.
Figure 2:
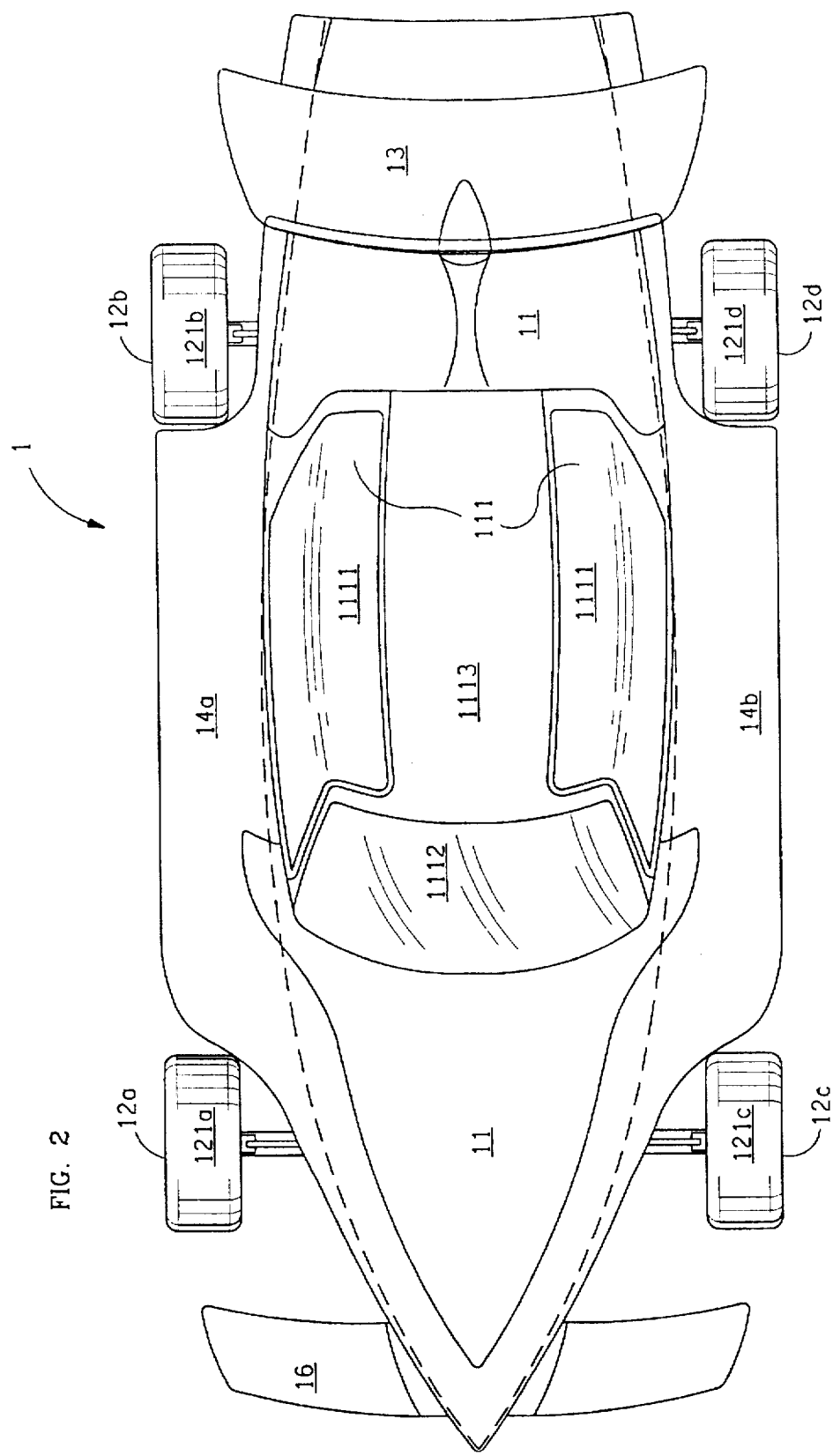
FIG. 2 is a top plan view of the preferred embodiment of the amphibious automobile in accordance with the present invention previously seen in FIG. 1.
Figure 3:
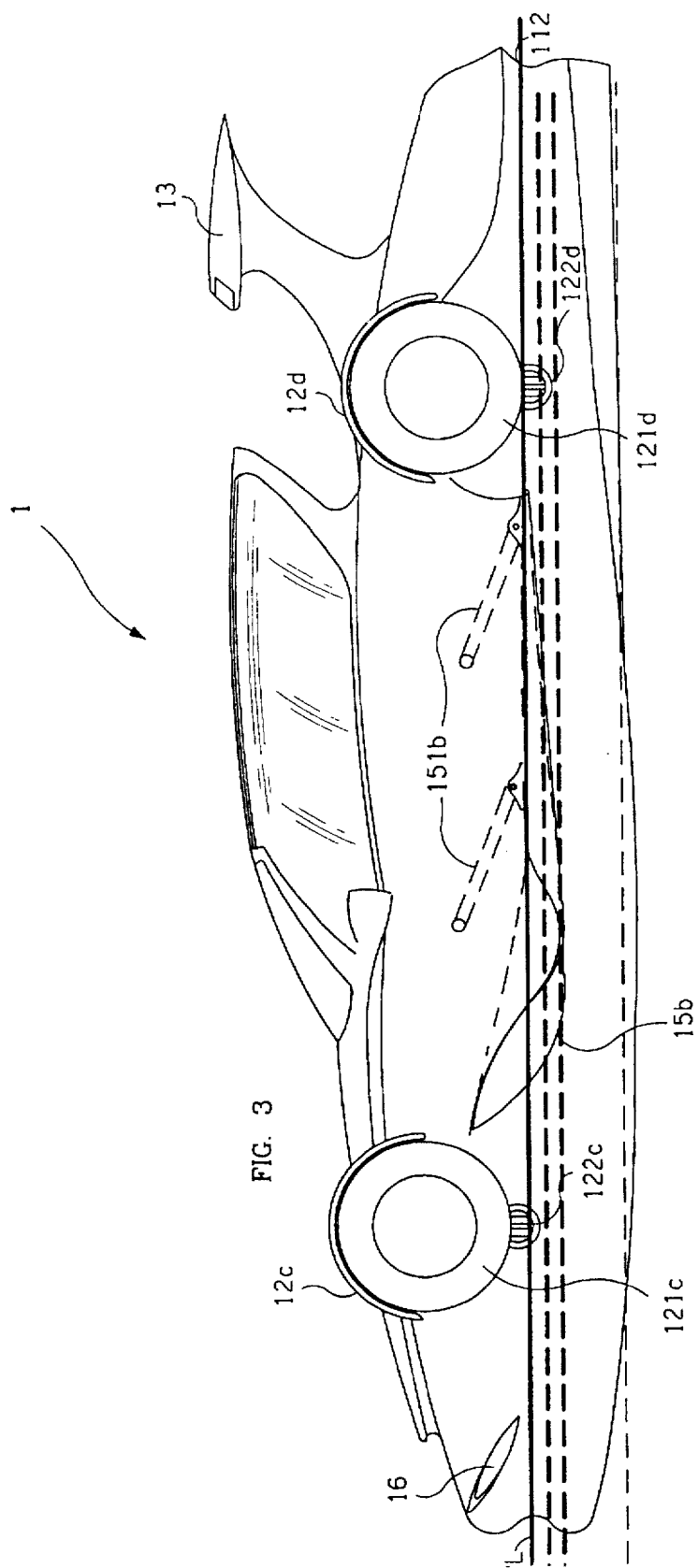
FIG. 3, consisting of FIGS. 3a and 3b, is a side plan view of the preferred embodiment of the amphibious automobile in accordance with the present invention previously seen in FIGS. 1 and 2 in use on land (i) with its wheels down, (ii) with its skis up, and (iii) with its canard angled down to the forward.
Figure 4:
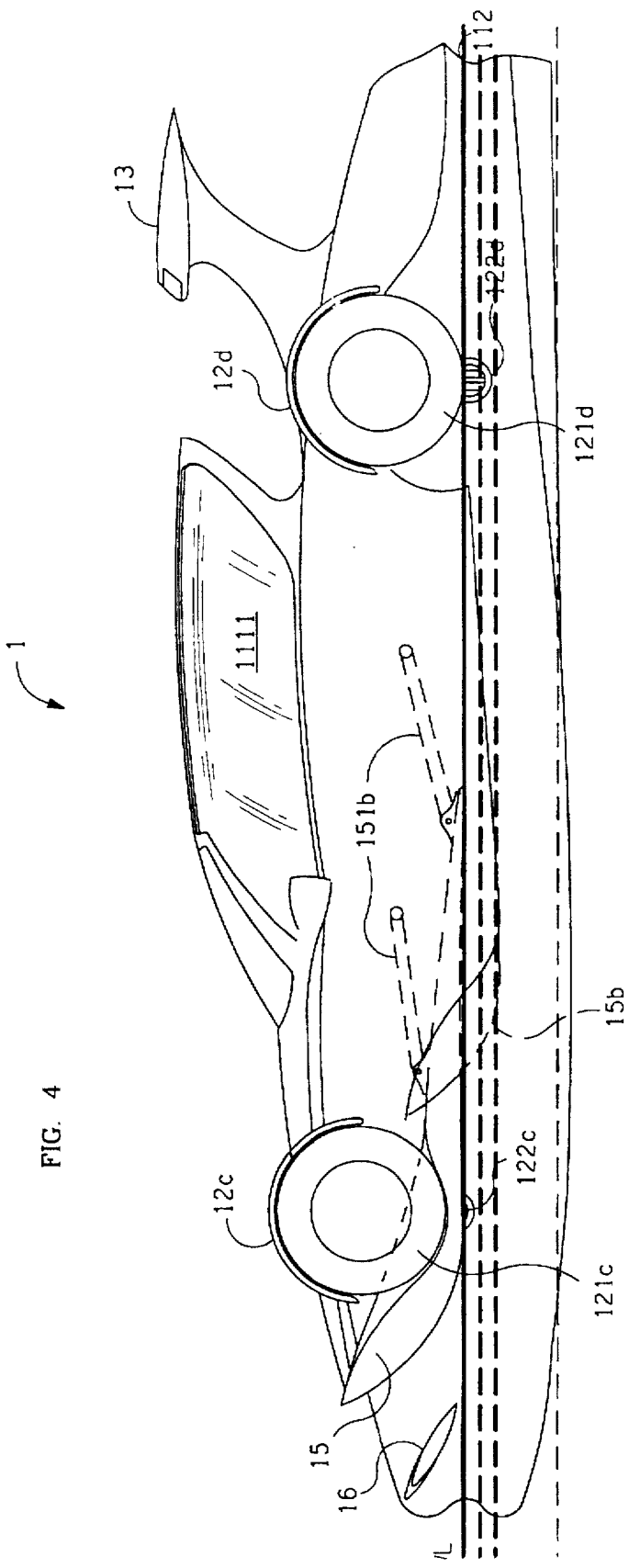
FIG. 4 is a side plan view of the preferred embodiment of the amphibious automobile in accordance with the present invention previously seen in FIGS. 1 through 3 in two operational regimes: 1) floating in the water (i) with its wheels up, (ii) with its two skis extended to the front and raised, and (iii) with its canard angled up to the forward, and 2) planning over the water (i) with its wheels up, (ii) with its two skis extended downwards, and (iii) with its canard angled up to the forward.
Figure 5:
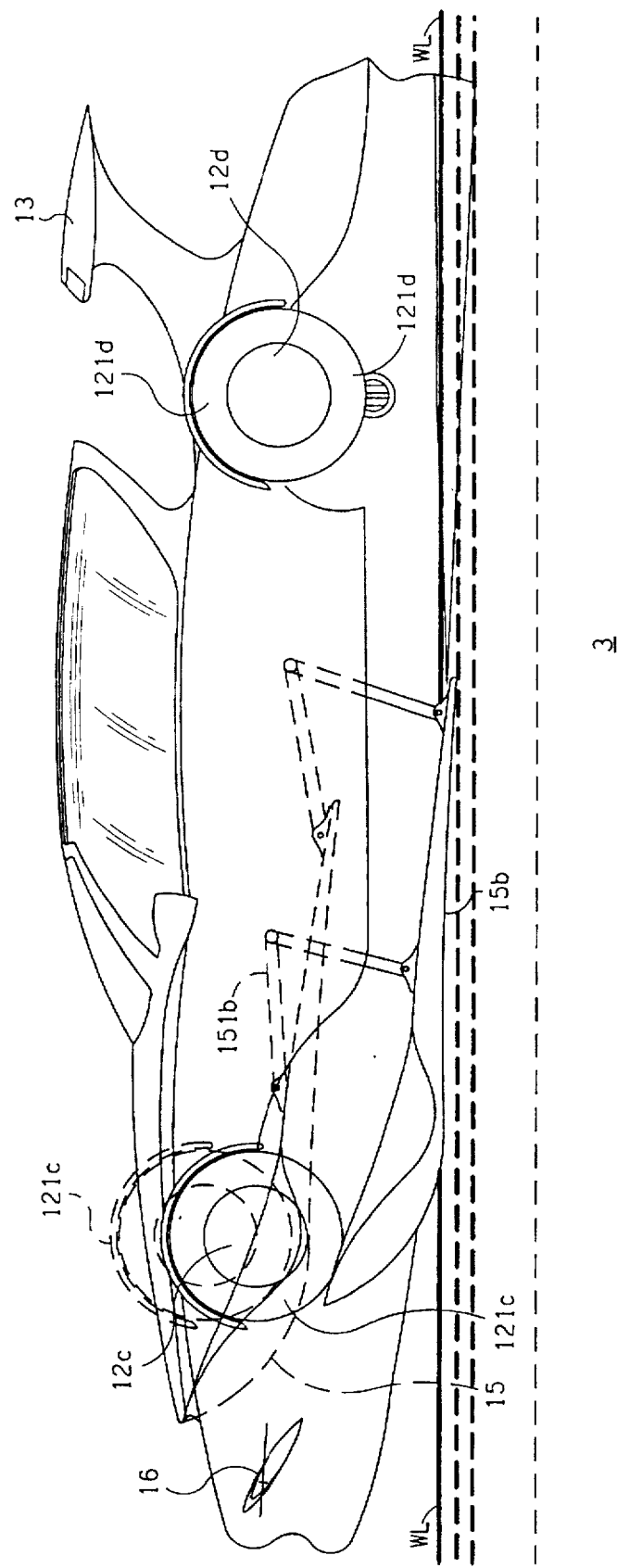
FIG. 5, consisting of FIG. 5a and FIG. 5b, is a side plan view of the preferred embodiment of the amphibious automobile in accordance with the present invention previously seen in FIGS. 1 through 4 (i) with its wheels up and (ii) with its canard angled up to the forward, showing (iii) extension of its two skis to the forward.

A diagrammatic perspective view showing a preferred embodiment of an amphibious automobile 1 in accordance with the present invention on land is shown in FIG. 1. A top plan view of the same embodiment is shown in FIG. 2. Side plan views of the same amphibious automobile 1 in the water are shown in FIGS. 3 through 5.

The amphibious automobile 1 is characterized by having a longitudinally centrally located body section 11 (best seen in FIG. 2) containing a passenger compartment 111 and an engine (not shown) that is typically located in the rear. The passenger compartment 111 is generally large enough for four adults typically seated in each of two front, and two rear, bucket seats (not shown). The centrally-located body section 11 has and presents, in all regions that are ever immersed in water, the substantial hydrodynamic profile of a canoe, or more precisely a so-called "camp" canoe having a truncated stern region, and a substantially flat substantially vertical rear end 112. This contour of the displacement hull is shown in dashed line in FIG. 2. This contour is efficient for slicing through the water.

The amphibious automobile 1 is further characterized by four wheel-and-suspension assemblies 12a–12d each of which is located and suspended outboard of the centrally located body section 11. The passenger compartment 111, and the entire centrally located body section 11, is watertight to the level of its side windows 1111, its front window 1112, and its sliding "canopy" windows 1113. The "canopy" windows slide forward and rearward on port-side and starboard-side tracks (not shown) between a forward position shown in solid line in FIG. 1, sealing shut the passenger compartment 111, and a rearward position, shown in dashed line in FIG. 113, where they are structurally supported by abutting the air intake and radiator column 13 for the automobile 1 and its engine. The sliding "canopy" side windows 1113 pass to either side of a fixed rear window (not clearly shown).

There are normally no doors, ingress to and egress from the passenger compartment 111 being realized through rearward positioning of the sliding "canopy" windows 1113. However, very, very short "doors" (not shown) may optionally be fitted to the sides of the passenger compartment 111 in the slight vertical space over the side boxes, or flares, 14a, 14b (best shown in FIG. 2)—as may best be imagined by reference to FIG. 3. If so fitted, the optional doors must close watertight. Normally, however, ingress and egress from the interior of the passenger compartment 111 is through either of the commodious port and starboard side openings created when the sliding "canopy" windows 1113 are slid to the rearward. Optional side windows 1111 may be fitted within, or as integral portions of, the canopy windows 1113, and to the extent so fitted may be opened and closed (normally again by sliding) independently of the sliding of the "canopy" windows 1113 themselves. In this manner the windows are vaguely reminiscent of the side curtains of early sports cars where larger windows, or "side curtains" sometimes incorporated sliding "vent" panes. Each and all of the two side windows 1111 and the sliding "canopy" windows 1113 may be independently opened and closed from either the interior or the exterior of the automobile 1. The sophistication of the windows is important for good ventilation, which is obviously not realized from any air intakes in such low vent locations as are common to an automobile used exclusively on land.

Notably, the optional two sliding side windows 1111 and the sliding "canopy" windows 1113 all slide on narrow, tight-fitting, channels (not shown). Where so jointed, these channels are themselves tight fitting to the body section 11, and to the passenger compartment 111 of the centrally located body section 11. The preferred sliding windows 1111 and sliding "canopy" windows 1113 make when closed a very formidable barrier to entrance of water into the centrally-located body section 11 and thus into the displacement hull. Although not perfectly watertight at the level of its side windows 1111 and its front window 1112, the centrally-located body section 11 is highly resistant to the entrance of water, especially when its sliding "canopy" windows 1113 are closed and locked (normally by convertible-top-type manual mechanical latches, not shown) at their full forward positions.

The amphibious automobile 1 is unsinkable by virtue of (i) masses of flotation material (not shown) packed in regions of its centrally-located body section 11 not otherwise occupied by humans nor by the automobile's engine nor by its suspension, particularly including the regions under all seats, and (ii) the flotation of the tires (which are ample in size). However, it may well be imagined that it is deleterious to the mechanical function of the amphibious automobile 1, and it is hazardous and uncomfortable to humans who may be dependent upon the automobile 1 for shelter and protection, to flood its normally watertight interior volume in rough seas. Accordingly, the goal is not only to make the amphibious automobile 1 unsinkable, but to also make it unlikely to ever flood to such an extent as would, save for floatation, permit it to sink. This goal is ably realized by the optional sliding windows 1111 and the sliding "canopy" windows 1113. These elements are all strong, and fit together tightly and well.

When all elements are so closed and fitted to their protective positions, the automobile 1 is highly watertight. Although not so tight as a submarine—it being impossible on the basis of its overall flotation that the amphibious automobile 1 should ever submerge—the automobile 1 can be sealed against high sea states. The interior of the passenger compartment 111 can be very stuffy and uncomfortable under sealed conditions, the entire automobile 1 can pitch and roll violently with outside sea motion, and, in extreme sea states with waves breaking over the automobile 1, its engine can have trouble reliably obtaining necessary air. Nonetheless that the interior of the automobile 1—whether the automobile 1 is under power, or even if it is disabled and dead in the water—is not a pleasant place to be in a storm or in high seas, it is a relatively safe place to be. Once the passenger compartment 111 is sealed, its interior is likely as safe, or safer, for its occupants than being exposed in an open recreational powerboat or other watercraft. This alone is marked change from existing amphibious automobiles, which tend to exhibit poor seaworthiness due to their modest freeboard.

Barely visible in FIG. 1, and better shown in FIG. 2, are the side boxes, or flares, 14a, 14b which will soon be seen to contain the skis 15a, 15b. Externally, these side boxes 14a, 14b have substantially the regular, and contoured, appearance of the side boxes to certain modern generations of Indianapolis Motor Speedway-type racing cars. Although in a portion of their volumes the side boxes can likewise contain gasoline, they do not normally do so, containing instead flotation material in selected regions. Each side box 14a, 14b in general has a complex interior that, nonetheless to its complexity, may readily be envisioned if it is understood that it houses a corresponding one of the large, broad, steel skis 15a, 15b (i) aligned with its own longitudinal axis, and (ii) pantograph in movement to the downwards and to the forward, as will soon be shown.

Its exterior and interior contours thus make each side box 14a, 14b to be substantially hollow to the front, presenting a large opening substantially as wide as is the box itself (i) on a bottom surface downwards and to the front, continuing (ii) onto the front. It is through these openings that the skis 15a, 15b will be seen to be susceptible of being extended by a pantographic mechanical connection. However, but for the presence of the corresponding ski 15a, 15b within the box 14a, 14b,—and maybe even with the ski 15a, 15b within the box 14a, 14b—this opening to the forwards and downwards might be thought to be problematic to a automobile that at least at times moves forward in the water. It is of course the case that the internal contours of the side boxes 14a, 14b (ex of the pantograph arms 151a, 151b, which are minor) taper downwards to the rear in the regions above and to the rear of the skis 15a, 15b. Accordingly, what water enters the side boxes 14a, 14b during forward motion of the automobile 1 through the water is forced rearward and downwards by the internal contours of the side boxes 14a, 14b, thereby presenting only such reasonable hydrodynamic resistance as might be analogized to, for example, the outriggers of a canoe.

The dashed line in FIG. 2 represents the waterline contour of the displacement hull 11, as viewed from the top, at typical conditions of loading. When considered with the side profiles of FIGS. 1 and 3–5, this contour is described as that of a canoe, or, more precisely, a truncated-stern square-stern canoe commonly called a "camp canoe".

Also visible in FIG. 2 is the front canard 16. The canard 16 is moveable in angular position. Its angular position is not particularly critical for land operation of the automobile 1, but it is strongly preferred that the canard 16 should be positioned down to the forward so as to aerodynamically exert a downwards force on the automobile 1 at high speeds on land. It is likewise very strongly preferred that the angularly moveable front canard 16 should be oppositely angularly positioned—i.e., up to the forward so as to provide lift at the bow—when the automobile 1 is in the water. Indeed, at certain conditions of automobile loading, this rotational position of the canard 16 may be mandated because it prevents the bow from "submarining".

Side plan views showing the preferred embodiment of the amphibious automobile 1 in accordance with the present invention—previously seen in FIGS. 1 and 2—in various operational states in water are shown in FIGS. 3 through 5. In all views the waterline is designated "WL".

In the first in-water view of FIG. 3 the automobile 1 is shown nearly as it was previously configured during use on land (reference FIG. 1) save only that its wheels 121a–d—of which wheels 121c, 121d are visible in FIG. 3—are now raised. The mechanical mechanisms 122a–122d by which this is accomplished will be more completely shown in FIGS. 6 and 7. The starboard-side ski 15b of the automobile 1 (which ski 15b is more completely shown in FIGS. 4, 5 and 8) is still up (a part of the starboard-side ski 15 is shown in dashed line for being substantially concealed behind side box 14b). The canard 16 is preferably changed in rotation so as to be angled up to the forward, as illustrated. The side windows 1111, and the "canopy" windows 1113, are to the forward, and closed.

In the operational regime of the automobile 1 shown in FIG. 3 the automobile can, because of the canoe contour of its displacement hull, slice through the water fairly effectively. However, those waves that impinge against, particularly, the front of the front wheel and suspension assemblies 12a, 12c, and against the front tires 121c, 121a, tend to cause splashing.

The automobile 1 can actually be operated in water with its wheel and suspension assemblies 12a–12d lowered—which actually serves to slightly increase freeboard and reduce splashing—at the expense of a much degraded hydrodynamic contour, and resistance. The lowered wheel and suspension assemblies 12a–12d do, however, help to protect the displacement hull against impacts with the bottom during high speed operations in littoral waters.

A second waterborne operational regime of the same preferred embodiment of amphibious automobile 1 in accordance with the present invention that was previously seen in FIGS. 1 through 3 is next shown in FIG. 4. A moveable ski 15b of the two moveable skis 15a, 15b is shown in solid line in its first deployed position, and in dashed line in its original, storage, position within the side box 14b (as was best shown in FIG. 2). Movement of ski 15b between these two positions is under control of pantograph arms 151b. (Movement of ski 15a is likewise between an equivalent two positions is under control of pantograph arms 151a, not shown in FIG. 4, shown in FIG. 8.) The two moveable skis 15a, 15b may be, and preferably are, hollow, being made as steel members filled with foam flotation material of the like.

In this second operational regime of the automobile 1 as shown in FIG. 4 the automobile 1 is floating in the water 3 to the level of waterline WL. The wheels 121a–d (of which wheels 121c, 121d are shown) are up and raised. The two skis 15a, 15b (of which ski 15b is shown) are extended to the front and raised. Finally, the canard 16 is angled up to the forward. This second operational regime is the way that automobile 1 appears, and is configured by powered mechanisms under manual control, for general low-speed operation, or even while stationary, in adequately deep water.

Although it may be observed in FIG. 4 that the lowest level of window 1111—the distance of which point to waterline WL is equivalent to the stationary freeboard of the automobile 1—is adequately above the waterline WL, it may also be observed that the automobile 1 has and presents a great mass below the waterline WL. Such is the general curse of powered amphibious automobiles: the weight of the automobiles due primarily to their hulls and engines and power trains causes them to displace considerable water, and to correspondingly commonly accord only but sluggish performance in water.

Because of the canoe shape of its displacement hull 11, because of the improved hydrodynamic contour presented to the front edges of the front wheels 121a, 121c by the full forward deployment of the skis 15a, 15b, and because of the angled front canard 16, the automobile 1 of the present invention is more efficient than most in its second operational regime to cut through the water. The skis 15a, 15b as do shield and contour the front edges of the (raised) front wheels 121a, 121c, and the effect of the side boxes 141, 14b to force the water under themselves, and downwards and outward as opposed to against the (raised) rear wheels 121b, 121d, both serve to greatly improve the hydrodynamic contour. In other words, the small increase and draft and reduction and freeboard that is entailed in raising the wheel and suspension assemblies 12a–12 (and included tires 121a–121d) above the waterline WL, and the similar support of the skis 15a, 15b (just) above the waterline WL—both of which make the (canoe-shaped) displacement hull sit more deeply in the water—are advantageous trade-offs so as to permit the entire waterborne automobile 1 to be more hydrodynamic.

In its second operational regime illustrated in FIG. 4 the automobile 1 will slice through the water smoothly and efficiently. The configuration is especially suitable for heavy seas, and for low speed trolling during fishing. However, even with an engine of approximately 230 horsepower in a automobile 1 of overall length 19 feet and beam 8 feet, the maximum speed that can be reached in this second operational regime is about 12 knots, which is still much less than the approximate 35 knot speed obtainable when planing. This is, of course, much slower than even a V-shaped conventional boat of equal horsepower and size—let alone a planning runabout boat—because, primarily, even with its improved hydrodynamic contour the amphibious automobile 1 carries a great deal of weight associated with its function as a land-traveling automobile, and consequently sits in the water as if heavily laden—which it is. In fact, the amphibious automobile 1 weighs about 4000 lbs., which is modestly heavy for a car and very heavy for a boat of the hydrodynamic aspect ratio presented.

In accordance with the present invention, the amphibious automobile 1 can come onto plane on the top of the water. In so doing it will come to rest upon three points—a three point plane: its two skis 15a 15b and the rear of its pressure hull where exists the propulsion drive. This operation on plane is the third waterborne operational regime of the amphibious automobile 1.

In this third operational regime, the automobile 1 as was shown in FIG. 4 is now illustrated in dashed line in FIG. 5. The automobile 1 remains with all of its wheel and suspension assemblies 12a–12d (of which assemblies 12a, 12c are visible in FIG. 5) full up, and with its canard 16 angled up to the forward. However, the skis 15a, 15b (of which ski 15b is shown in FIG. 5) are gradually brought downwards by manual control under power as the automobile 1 proceeds under heavy throttle through the water until finally assuming the position relative to the automobile 1, and to the waterline WL, that are shown in solid line in FIG. 5. At this point the bow of the automobile 1 is clearly (slightly) above the water and the waterline, and the automobile 1 is on plane on its two skis 15a, 15b and the stern region of its pressure hull.

. Notably, in accordance that its skis are lowered as speed is increased, the automobile 1 comes onto plane relatively gracefully. Similarly, the combined front surfaces of the skis 5a, 15b, the front wheel and suspension assemblies 12a, 12c, and the displacement hull all make that, in the rare eventuality that the skis 15a, 15b cannot be smoothly lowered as the throttle is reduced coming off plane, that, even upon an abrupt loss of power, the automobile 1 will at all times maintain stability. Smoothness of operation, as well as the great extension of the operational "envelope" particularly as involves over-the-water speed, is one of the unexpected benefits of the reconfigurable surfaces of the automobile 1 of the present invention. If the highway exhaust system is retained, and vented under water, the automobile 1 is reasonably quiet. Moreover, the amphibious automobile enters and exits the on-plane condition as, or more, smoothly than do most boats. Accordingly, the amphibious automobile is a relatively "smooth ride" on water and on land—especially considering its hydrodynamic aspect ratio.

The exemplary manner and exemplary preferred mechanisms by which this versatile reconfigurability is realized are shown in the remaining FIGS. 6–10. The centrally located body section 11 is connected to each of the four wheel-and-suspension assemblies 12a–12d, and to the wheels 121a–121d within such wheel-and-suspension portions 12a–12d, by hinged suspension arms and struts 122a–122d and by steering gear 123a–123d. The hinged suspension arms and struts 122a–122d are partially within, and partially without, the watertight volume of the passenger (and engine) compartment 111 of the centrally located body section 11 by passing through a watertight rubber baffle, or seal, 124a–d.

The suspension arms and struts 122a–122d are preferably corrosion resistant metals pivoting in rubber bushings, as is typical of the automobiles of manufacturer Mercedes Benz. The preferred front McPhearson struts and rear shock absorbers 124a–d are conventional, and are gas and air tight. Although water, especially salt water, corrosion of all outboard components—including the suspension arms and struts 122a–122d—is an operational consideration, most parts are, nonetheless to being of completely conventional construction, adequate to function normally long during land usage of the amphibious automobile 1 despite occasional immersion in water.

The steering gear 123a–123d, and the axle half shafts 125a–125d, all extend from the interior of the watertight volume of the passenger (and engine) compartment 111 of the centrally located body section 11 to the exterior of this volume, passing through the watertight rubber baffles 124a–d. The baffles 124a–d move in and out with the steering rods as the automobile 1 is steered and turned by its front wheels, up and down as motion in the front suspension is encountered on land, and up and down as the front wheel-and-suspension portions 12a and 12c are raised for travel on water. The range of in-and-out, up-and-down, and even back-and-forth motions encountered by the steering rods where they exit the watertight volume of the passenger (and engine) compartment 111 of the centrally located body section 11 is not great, and the rubber baffles 124a–d suffice admirably to reliably seal this region watertight. It is well that they should do so because they are necessary for water tightness of the displacement hull.

The axle half shafts 125a–125d do not move any appreciable amount laterally relative to the centrally located body section 11, and, similarly to the steering rods, they also incur but little transverse movement where they exit from the interior of the watertight volume of the passenger (and engine) compartment 111 of the centrally located body section 11 to the exterior of this volume. The axle half shafts 125a–125d do, however, rotate—at least during land usage of the automobile 1. They correspondingly pass through waterproof bearings which, although well known and reliable for usage on automobiles including military automobiles, represent one of the few drive line components on the entire automobile 1 that are not completely standard with equivalent land-only automobiles. Four wheel drive is preferred, making that four driven axle half shafts 125a–125d pass through four watertight bearings.

Additional electrical and hydraulic connections through the centrally located body section 11 are few in number, and the numbers that do exist are intentionally minimized—even at the expense of extra lengths of wiring and plumbing exterior to the centrally located body section 11. This is because it is considered more important to preserve the watertight integrity of the volume of the passenger (and engine) compartment 111 of the centrally located body section 11 than to save the modest additional corrosion and wear resulting from added lengths of exposed external wiring and plumbing. All external electrical and hydraulic lines are in any case very easy to inspect, access and, if necessary, maintain and/or repair.

Importantly to the present invention, each of the outboard wheel-and-suspension portions 12a–12d have and present several moving parts (beyond such wheel rotation, steering and suspension travel as is routine for an automobile). In the first place, each of the outboard wheel-and-suspension portions 12a–12d is hydraulically or electrically raised and lowered by an associated gear motor 126, acme screw 127, acme screw follower block 128, and linkage 129. The wheels 121a–121d may in particular be lowered to increase ground clearance of the automobile 1 for land travel over rough terrain. Notably, the wheels 121a–121d may also be raised until ground clearance is less than zero, which means that, on land, the automobile 1 sits on the bottom of its centrally located body section 11 and is manifestly unsuitable for land travel. The reason that the wheels 121a–121d, and associated suspension and drive line elements, raise so for is, of course, that this is their preferred positions for travel on water.

Figure 6:
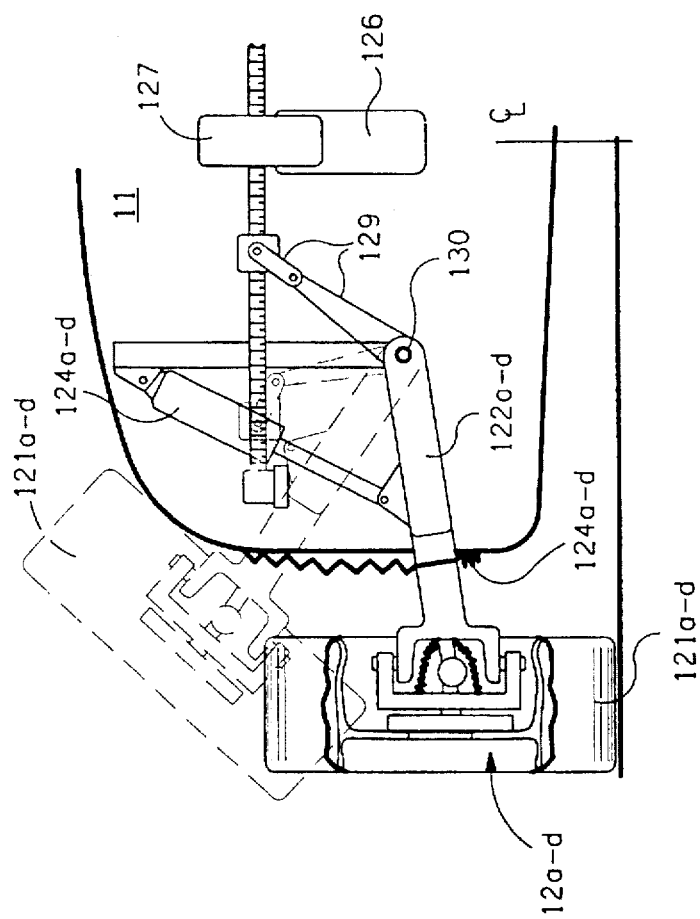
FIG. 6 is a cut-away plan view of a moveable wheel, with its associated steering and lift mechanism, in its up position in the preferred embodiment of the amphibious automobile in accordance with the present invention previously seen in FIGS. 1 through 5.
Figure 7:
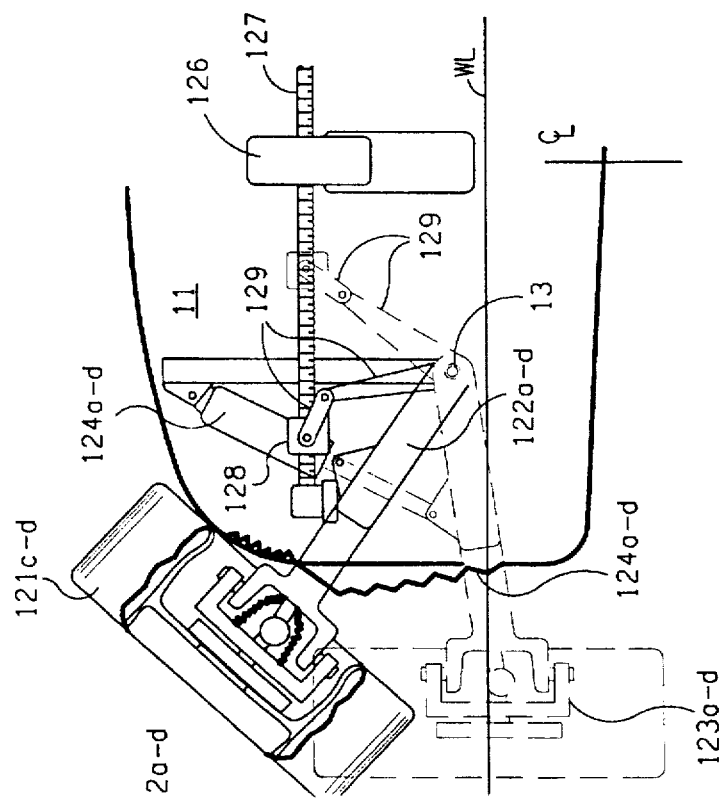
FIG. 7 is a cut-away plan view of the moveable rear wheel, and its associated steering and lift mechanism, previously seen in FIG. 6 now in its down position.
Figure 8:
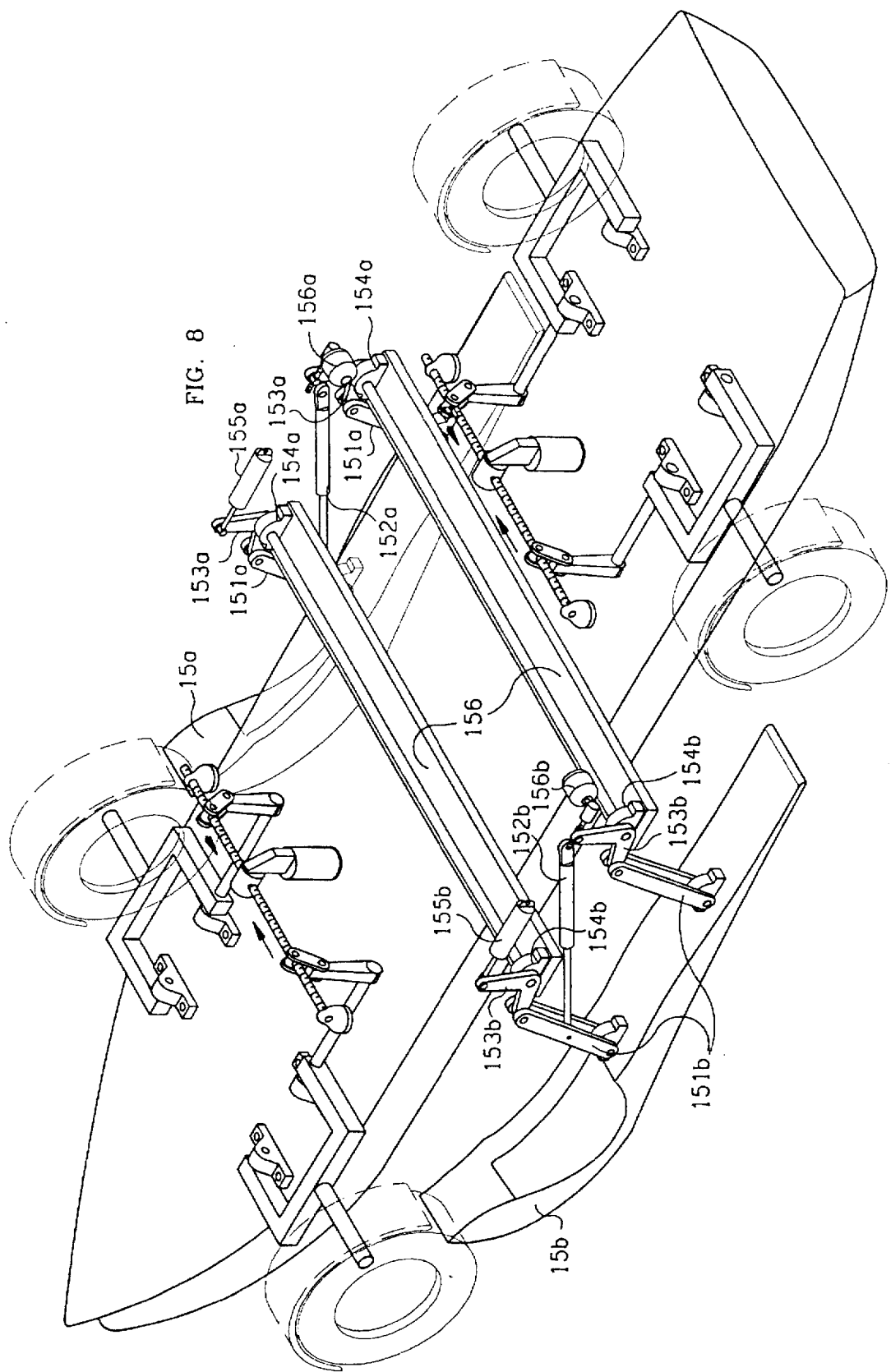
FIG. 8 is a detail side plan view of the preferred embodiment of the amphibious automobile in accordance with the present invention previously seen in FIGS. 1 through 5 showing the manner of the extension of a ski, the ski being shown in solid line at is location when the amphibious automobile is on plane.

The torsion bars 130, which are seem but end on in FIGS. 6 and 7, are better shown in the perspective view of FIG. 8.

The mode and manner by which the gear motor 126, the acme screw 127, the acme screw follower block 128, and the linkage 129 operate to raise and to lower the wheel-and-suspension portions 12a–12d is also diagrammatically illustrated in FIG. 8. Finally, the operation of electrical or hydraulic actuator 152a, 152 respectively through bell cranks 153a, 153b held for pivoting in pillow blocks 154a, 154b and against the damping of shock absorbers 155a, 155b serves to angle the pantographic arms 151a, 151b relative to the fixed cross-members 156 so as to raise and lower the skis 15a, 15b. Finally, further electrical or hydraulic actuators 156a, 156b serve to permit a fine adjustment of the fore-aft trim angle of the skis 15a, 15b.

Figure 9:
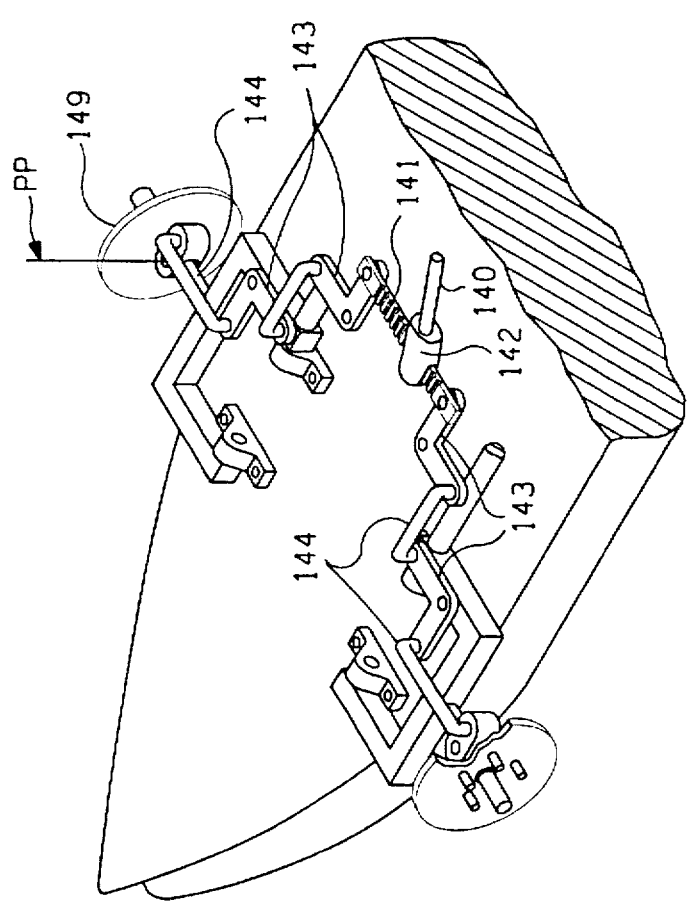
FIG. 9 is a cut-away plan view of a moveable font wheels particularly showing their associated steering in the preferred embodiment of the amphibious automobile in accordance with the present invention previously seen in FIGS. 1 through 5.

The preferred construction of the steering gear, omitted from FIG. 8 of clarity, is shown in FIG. 9. A steering shaft 140 acts though a rack 141 and pinion 142 to move first and second bell crank connecting links 143 and first and second tie rods 144 so as to change the left-right angular orientation of the hubs 145 to which the wheels 121a–121d are attached.

Figure 10:
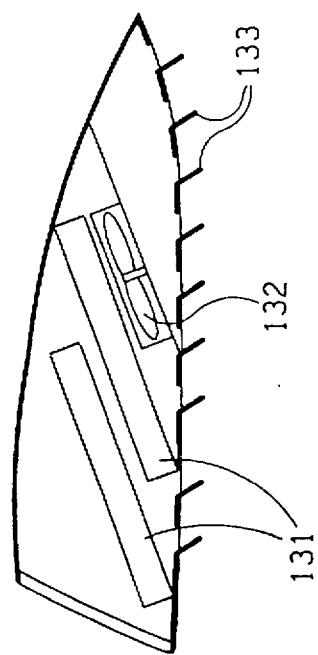
FIG. 10, consisting of FIGS. 10a though 10c, are cutaway side plan views of various sizes and locations of one or more engine radiators in the preferred embodiment of the amphibious automobile in accordance with the present invention previously seen in FIGS. 1 through 5.

The preferred location of a preferred two heat exchangers, or radiators, 131 along with a fan 132 in the crest of the column 13 is illustrated in FIG. 10. Louvers preferably control the flow of air through the radiators 131. Air streams are provided to each of (i) the engine (not shown), and (ii) the passenger compartment 111.

In accordance with the preceding explanation, variations and adaptations of an amphibious automobile, and particularly an amphibious automobile, in accordance with the present invention will suggest themselves to a practitioner of the mechanical, automotive, and amphibious automobile design arts. For example, the propulsion can be by either propeller of jet pump. For example, the engine can be located in either the front, or the rear, of the centrally located section 11.

In accordance with these and other possible variations and adaptations of the present invention, the scope of the invention should be determined in accordance with the following claims, only, and not solely in accordance with that embodiment within which the invention has been taught.

What is claimed is:

1. An amphibious vehicle comprising:

a displacement hull in the substantial shape of a canoe;

four wheels, two front and two rear all located in positions outboard of the displacement hull, that raise and that lower; and two skis, also located in positions outboard of the displacement hull, each of which (i) is stowed in line between a front wheel and a rear wheel when the amphibious vehicle is on land, (ii) is extended to the forward under a front wheel when the amphibious vehicle is in water, and (iii) is retracted to the downward from its forwardly-extended position when the amphibious vehicle planes upon a surface of the water.

2. An amphibious automobile comprising:

a displacement hull of a shape suitable to slice through the water;

two moveable front wheels, attached to the hull and moveable between (i) down positions helping to support the hull above a surface of the earth for operation of the amphibious automobile on land, and, when the amphibious automobile is floating in the water, (ii) up positions where the into the water below the hull; and two skis each of which is attached to the hull and moveable between an up position both closely proximate to the displacement hull and so integrated into the shape thereof so as support and permit that the displacement hull should slice through the water, a down position extending downwards from the hull sufficiently and below the two moveable front wheels in their up positions;

wherein the two skis in their down positions serve as two surfaces on which, along with a portion of the hull, the amphibious automobile may rise onto plane upon the surface of the water.

3. The amphibious automobile according to claim 2 wherein the displacement hull is of a "U" shaped horizontal cross-section at the bow.

4. An amphibious automobile comprising:

a displacement hull in the substantial shape of a canoe;

four wheels, two front and two rear all located in positions outboard of the displacement hull, that raise and that lower; and two moveable skis, each movably attached to the displacement hull for moving between (i) a first, raised, position in line between a front and a rear wheel where clearance is provided for travel of the automobile on its lowered wheels on land and (ii) a second, forwardly-advanced, position underlying a raised front wheel where waves are at least partially deflected from at least a part of the raised front wheel during travel of the automobile through the water, and (iii) a third, downwards, position where the automobile planes upon the surface of the water.

5. An amphibious automobile comprising:

a centrally located displacement hull body section, containing a passenger compartment and an engine with a steering wheel, that has and presents when floating in water the substantial hydrodynamic aspect of a canoe, having a length that is at least two and one-half times the beam at the water line;

wheels located in positions outboard of the centrally located displacement hull body section;

suspension elements and steering gear respectively linking the engine and steering wheel within the displacement hull body section to the wheels; and seals for enshrouding watertight the suspension elements and steering gear where they pass through the displacement hull body section en route to the wheels.

6. The amphibious automobile according to claim 5 wherein the wheels located in positions outboard of the central body section, and the suspension elements, in combination further comprise:

means for raising and for lowering the wheels between a first, lowered, position for travel of the amphibious automobile on its wheels on land and a second, raised, position during passage of the automobile and its wheels through water.

7. The amphibious automobile according to claim 5 further comprising:

moveable skis behind at least two wheels which skis move between a first, raised, position providing clearance to the ground for travel of the amphibious automobile on its wheels on land and a second, lowered, position where curved tips of the skis reach around towards the front of the wheels and serve to help to deflect such water under the wheels as tends to impinge against the frontal surface of the wheels during a forward passage of the automobile and its wheels through water.

8. An amphibious automobile comprising:

a body displacing water so as to form a displacement hull when the amphibious automobile is in water;

front and rear wheels that may be raised and lowered relative to the body; and moveable skis behind the front wheels that move between a first, raised, position providing clearance to the ground for travel of the amphibious automobile on its wheels on land and a second, forward, position where curved tips of the skis are under the front of the front wheels, serving to help to deflect such water under the front wheels as tends to impinge against the frontal surface of the front wheels during a forward passage of the amphibious automobile including its wheels through water.

9. The amphibious automobile according to claim 8 wherein the moveable skis further move between their second, forward, position and a third, lowered, position where the skis serve, along with an aft portion of the body, to provide a surface upon which the automobile may plane upon the surface of the water.

10. The amphibious automobile according to claim 9 further comprising:

a pantographic mechanism connecting the skis to the body so that the skis may move forward between, in order, their first and their third and their second positions, and aft between, in order, their second and their third and their first positions, in an arc.er.

11. The amphibious automobile according to claim 8 wherein the moveable ski rests against the wheel in its second, forward, position;

wherein with structural support provided by the wheel to the ski during passage through water.

12. The amphibious automobile according to claim 8 wherein the wheels raise and lower between a first, lowered, position for travel of the amphibious automobile on its wheels on land and a second, raised, position during passage of the automobile and its wheels through water.

13. The amphibious automobile according to claim 12 wherein the wheels raise so far in their second, raised, position that ground clearance of the automobile is nil.

14. The amphibious automobile according to claim 8 wherein the body comprises:

a centrally located body section, containing a passenger compartment and an engine, that has and presents when floating in water the substantial hydrodynamic aspect of a canoe, having a length that is at least two and one-half times the beam at the water line;

wherein the raising-and-lowering wheels, and the moveable skis, are all substantially located outboard of the centrally located body section.

15. An improvement to an amphibious automobile including front and rear wheels that raise and lower in positions outboard of a body, the improvement comprising:

two moveable skis, also outboard of the body, that cantilever on pantograph arms between (i) a raised, position each behind a lowered outboard front wheel where clearance between each ski and its pantograph arms and ground is provided for travel of the amphibious automobile on its wheels on land, and (ii) a lowered position each below a raised outboard front wheel where the two skis serve, along with an aft portion of the body when the outboard rear wheels are also raised, to provide a surface upon which the amphibious automobile may plane upon the surface of the water.

16. A method of adjusting the lift of an amphibious automobile having a displacement hull, and four wheels, the method being directed to getting the amphibious automobile onto plane quickly and smoothly and to maintaining planning efficiently, the method comprising:

starting the amphibious automobile from a stationary position whereat the hull assumes a substantially contiguous "U" shape that tends to cut through the water without forcing the amphibious automobile higher in the water with increasing speed though the water; and then as the amphibious automobile picks up speed in the water on its "U"-shape hull, raising the front wheels of the amphibious automobile and extending skis progressively downwards from the moving hull, which skis serve in their extension and their progressively increasing downwards extension as lifting surfaces tending to force the amphibious ever higher in the water with increasing speed through the water until, and finally as the skis are extend downwards while the amphibious automobile reaches sufficient forward speed, the amphibious automobile progressively goes onto plane on planing surfaces presented by (i) its two skis and (ii) an aft portion of its displacement hull.

17. An amphibious automobile comprising:

a displacement hull of a shape that is suitable to slice through the water, but that is substantially ineffective to provide a sufficient lifting force so as to permit the watercraft to come onto a plane exclusively on the hull;

raising and lowering front and rear wheels, suspended from the displacement hull, that permit the amphibious automobile to roll on land;

two moveable skis, attached to the hull and cantilevering on pantograph arms so as to extend into the water in positions below the raised front wheels, that provide during forward movement of the automobile through the water a lifting force by which the automobile may come onto plane on its plurality of skis and on an aft portion of its displacement hull while the rear wheels are simultaneously raised above the plane.

18. The amphibious automobile according to claim 17 wherein the front wheels are moveable in height relative to the displacement from down positions permitting the amphibious automobile to roll on land to, when the amphibious automobile is floating in the water, up positions where the bottoms of the wheels are near to the surface of the water;

wherein two of the plurality of skis are moveable to down positions where they are below the front wheels in their up positions.

19. The amphibious automobile according to claim 17 wherein the displacement hull is of a "U" shaped horizontal cross-section at the bow.

20. The amphibious automobile according to claim 17 wherein the displacement hull is in the substantial contour of a canoe.

21. The amphibious automobile according to claim 17 wherein the displacement hull is in the substantial contour of a camp canoe having a truncated, vertical stern.

22. The amphibious automobile according to claim 17 further comprising:

a moveable canard affixed to the front of the displacement hull.

* * * * *